(12) United States Patent　　　(10) Patent No.:　　US 7,270,467 B2
Kim　　　　　　　　　　　　　　　(45) Date of Patent:　　Sep. 18, 2007

(54) BACKLIGHT ASSEMBLY AND FLAT PANEL DISPLAY APPARATUS HAVING THE SAME

(75) Inventor: Yong-Il Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 196 days.

(21) Appl. No.: 11/023,647

(22) Filed: Dec. 29, 2004

(65) Prior Publication Data

US 2005/0162868 A1　　Jul. 28, 2005

(30) Foreign Application Priority Data

Dec. 30, 2003　(KR) ...................... 10-2003-0099854

(51) Int. Cl.
　　*F21V 7/04*　　(2006.01)
(52) U.S. Cl. ...................... 362/634; 362/225; 362/613; 349/58; 349/67
(58) Field of Classification Search ................ 362/613, 362/614, 630, 632, 633, 517, 225; 349/58, 349/67
　　See application file for complete search history.

(56) References Cited

U.S. PATENT DOCUMENTS

| 6,880,953 | B2 * | 4/2005 | Shin ............................ 362/225 |
| 6,974,221 | B2 * | 12/2005 | Wu et al. ...................... 362/29 |
| 2003/0234896 | A1 | 12/2003 | Kim ............................. 349/65 |

FOREIGN PATENT DOCUMENTS

| JP | 62-80623 | 4/1987 |
| JP | 2000-216437 | 8/2000 |
| JP | 2001-318614 | 11/2001 |

OTHER PUBLICATIONS

Patent Abstracts of Japan, Publication No. 62-080623, Apr. 14, 1987, 1 p.
Patent Abstracts of Japan, Publication No. 2000-216437, Aug. 4, 2000, 1 p.
Patent Abstracts of Japan, Publication No. 2001-318614, Nov. 16, 2001, 1 p.

* cited by examiner

*Primary Examiner*—John Anthony Ward
(74) *Attorney, Agent, or Firm*—MacPherson Kwok Chen & Heid LLP (57) ABSTRACT

In a backlight assembly and a flat panel display apparatus, the backlight assembly has a diffusing plate, a supporting member and a reflecting plate. The supporting member has a base body portion, a supporting portion supporting the diffusing plate and a lamp holder receiving lamps to uniformly maintain spaced intervals between the lamps. The base body portion is disposed under the reflecting plate. The supporting portion and the lamp holder are inserted through engaging openings formed at the reflecting plate such that the supporting portion and the lamp holder are upwardly protruded with respect to the reflecting plate. Accordingly, the backlight assembly may reduce an area of the reflecting plate covered by the supporting member, thereby providing the light having uniform brightness distribution.

24 Claims, 4 Drawing Sheets

BACKLIGHT ASSEMBLY AND FLAT PANEL DISPLAY APPARATUS HAVING THE SAME

CROSS-REFERENCE TO RELATED APPLICATION

This application relies for priority upon Korean Patent Application No. 2003-99854 filed on Dec. 30, 2003, the contents of which are herein incorporated by reference in its entirety.

BACKGROUND OF THE INVENTION

1. Field of the Invention

The present invention relates to a backlight assembly and a flat panel display apparatus having the backlight assembly. More particularly, the present invention relates to a backlight assembly capable of providing a light having a uniform brightness distribution and a flat panel display apparatus having the backlight assembly.

2. Description of the Related Art

In general, in order to visually confirm information processed in an information-processing device, a flat panel display apparatus for a role as an interface displays an image in response to an image signal externally provided.

A liquid crystal display apparatus, which is one of the flat panel display apparatus, uses optical properties of liquid crystal so as to display an image. A liquid crystal display apparatus, generally, includes a liquid crystal display panel that displays an image corresponding to an image signal using a light and a backlight assembly that provides the light to the liquid crystal display apparatus.

The backlight assembly is classified into an edge type backlight assembly and a direct illumination type backlight assembly in accordance with a position where a light source that is emitting the light is positioned.

The edge type backlight assembly has at least one light source disposed at a position adjacent to a side face of a light guide plate. The direct illumination type backlight assembly has a plurality of light sources disposed under the liquid crystal display panel. The light sources of the direct illumination type backlight assembly directly irradiate the light over the liquid crystal display panel.

The direct illumination type backlight assembly has a diffusing plate disposed between the light sources and the liquid crystal display panel, a supporting member that maintains an interval between the light sources and the diffusing plate, a reflecting plate that reflects the light from the light sources to the diffusing plate, and a receiving container that receives the light sources.

The supporting member disposed between the reflecting plate and the diffusing plate is disposed on the reflecting plate. Thus, the supporting member partially covers an upper face of the reflecting plate, and the covered area of the upper face of the reflecting plate may not reflect the light from the light sources to the diffusing plate. That is, the covered area of the reflecting plate has reflectance lower than reflectance at an area not covered by the supporting member, so that the reflecting plate may not uniformly provide the light to the diffusing plate. As a result, a display quality of the liquid crystal display apparatus may be deteriorated.

BRIEF SUMMARY OF THE INVENTION

The present invention provides a backlight assembly capable of providing a light having a uniform brightness distribution.

The present invention provides a flat panel display apparatus having the above backlight assembly.

In one aspect of the present invention, a backlight assembly includes a lamp emitting a light, a diffusing member, a reflecting member and supporting member.

The diffusing member diffuses the light provided from the lamp. The reflecting member is disposed under the lamp to reflect the light provided from the lamp to the diffusing member. The supporting member is disposed under the reflecting member to support the diffusing member. The supporting member partially passes through the reflecting member and is upwardly protruded with respect to the reflecting member.

In another aspect of the present invention, a flat panel display apparatus includes a display panel and a backlight assembly.

The display panel displays an image using a light externally provided.

The backlight assembly has a lamp emitting a light, a diffusing member, a reflecting member and supporting member. The diffusing member diffuses the light provided from the lamp and provides the diffused light to the display panel. The reflecting member is disposed under the lamp to reflect the light provided from the lamp to the diffusing member. The supporting member is disposed under the reflecting member to support the diffusing member. The supporting member partially passes through the reflecting member and is upwardly protruded with respect to the reflecting member.

According to the backlight assembly and the flat panel display apparatus, since a portion of the supporting member is disposed on the reflecting member, the backlight assembly may provide the light having uniform brightness distribution to the display panel.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE PREFERRED EMBODIMENT

Hereinafter, the present invention will be explained in detail with reference to the accompanying drawings.

Figure 1:
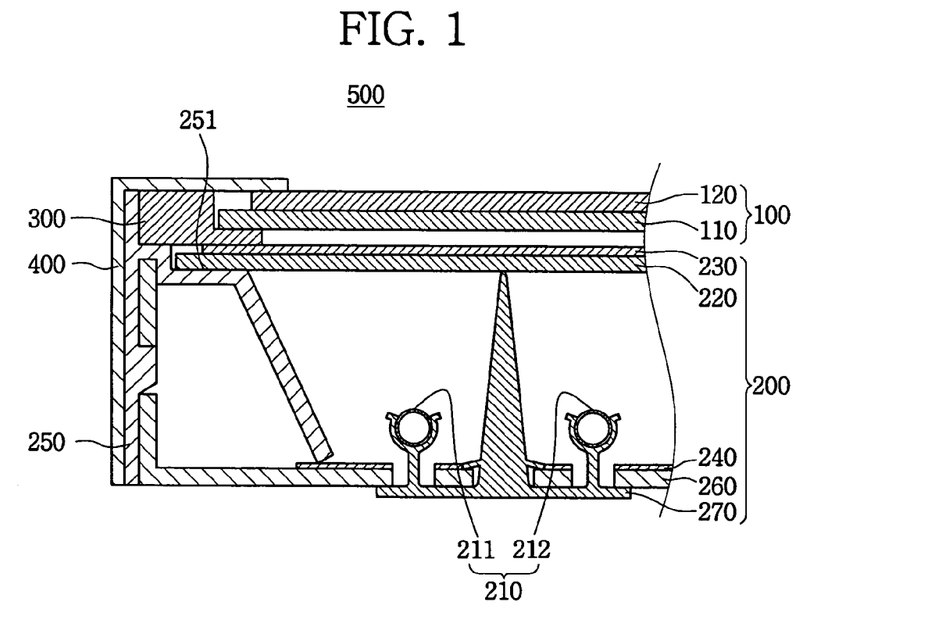
FIG. 1 is a cross-sectional view showing a flat panel display apparatus according to an exemplary embodiment of the present invention.

FIG. 1 is a cross-sectional view showing a flat panel display apparatus according to an exemplary embodiment of the present invention.

Referring to FIG. 1, a flat panel display apparatus 500 includes a liquid crystal display panel 100 that displays an image using a light, a backlight assembly 200 that provides the light to the liquid crystal display panel 100, a first mold frame 300 that receives the liquid crystal display panel 100, and a top chassis 400.

The liquid crystal display panel 100 has a thin film transistor substrate 110, a color filter substrate 120 coupled to the thin film transistor substrate 110, and a liquid crystal layer (not shown) disposed between the thin film transistor substrate 110 and the color filter substrate 120.

The thin film transistor substrate 110 is a transparent substrate on which thin film transistors are formed in a matrix configuration. The color filter substrate 120 facing the thin film transistor substrate 110 is a transparent substrate formed in a thin film process. Red (R), green (G) and blue (B) color pixels are formed on the color filter substrate 120.

The backlight assembly 200 disposed under the liquid crystal display panel 100 uniformly provides the light to the liquid crystal display panel 100.

The backlight assembly 200 includes a plurality of lamp 210 that emits the light, a diffusing plate 220 and a diffusing sheet 230 that diffuse the light, a second mold frame 250 that receives the lamps 210, a reflecting plate 240 and the lamps 210, and a supporting member 270 that maintains an interval between the receiving container 260 and the diffusing plate 220.

Particularly, the lamps 20 emit the light in response to a power voltage externally provided. The lamps 210 are disposed under an effective display area of the liquid crystal display panel 100 on which the image is displayed. The lamps 210 are arranged in parallel to each other to provide the light to the liquid crystal display panel 100. In FIG. 1, the lamps 210 have a first lamp 211 and a second lamp 212, but the flat panel display apparatus 500 may have substantially more than two lamps.

The diffusing plate 220 and the diffusing sheet 230 are sequentially disposed between the lamps 210 and the liquid crystal display panel 100. The diffusing plate 220 and the diffusion sheet 230 diffuse the light emitted from the lamps 210, and provide the diffused light to the liquid crystal display panel 100.

The reflecting plate 240 is disposed under the lamps 210. The reflecting plate 240 reflects the light emitted from the lamps 210 to the diffusing plate 220 so as to enhance a light efficiency. The reflecting plate 240 has a plurality of engaging openings through which a portion of the supporting member 270 passes.

The second mold frame 250 receives the lamps 210, the diffusing plate 220 and the diffusion sheet 230. The second mold frame 250 has a bottom plate partially opened and a sidewall extended from the bottom plate. The lamps 210 are disposed on the bottom plate of the second mold frame 250. The second mold frame 250 has a stepped portion 251 protruded from the sidewall so as to sequentially receive the diffusing plate 220 and the diffusing sheet 230.

In this exemplary embodiment, in order to uniformly provide the light to the liquid crystal display panel 100, the lamps 210 are disposed at positions spaced apart from the diffusing plate 220 in a predetermined distance. Also, the lamps 210 are spaced apart from each other in a predetermined distance.

The second mold frame 250 is coupled to the receiving container 260. The receiving container 260 receives the reflecting plate 240 and the lamps 210. The receiving container 260 has a plurality of openings formed through an area corresponding to the engaging openings formed through the reflecting plate 240 such that the supporting member 270 is inserted.

A portion of the supporting member 270 is disposed under the receiving container 260. The supporting member 270 supports the diffusing plate 220 such that the distance between the lamps 210 and the diffusing plate 220, and also supports the lamps 210 to be uniformly spaced apart from each other.

The supporting member 270 is coupled to the receiving container 270. A number of supporting members may increase or decrease depending upon a size of the flat panel display apparatus 500.

The first mold frame 300 is disposed on the backlight assembly 200. The mold frame 300 has a bottom plate partially opened such that the light from the backlight assembly 200 disposed under the first mold frame 300 is provided to the liquid crystal display panel 100. The first mold frame 300 receives the liquid crystal display panel 100. The first mold frame 300 is coupled to the second mold frame 250 so as to fix the diffusing plate 220 and the diffusing sheet 230 to the second mold frame 250.

The top chassis 400 is disposed on the liquid crystal display panel 100. The top chassis 400 is coupled to the receiving container 260 to fix the liquid crystal display panel 100 to the first mold frame 300. The top chassis 400 covers edge of the liquid crystal display panel 100 except for the effective display area on which the image is displayed.

Figure 2:
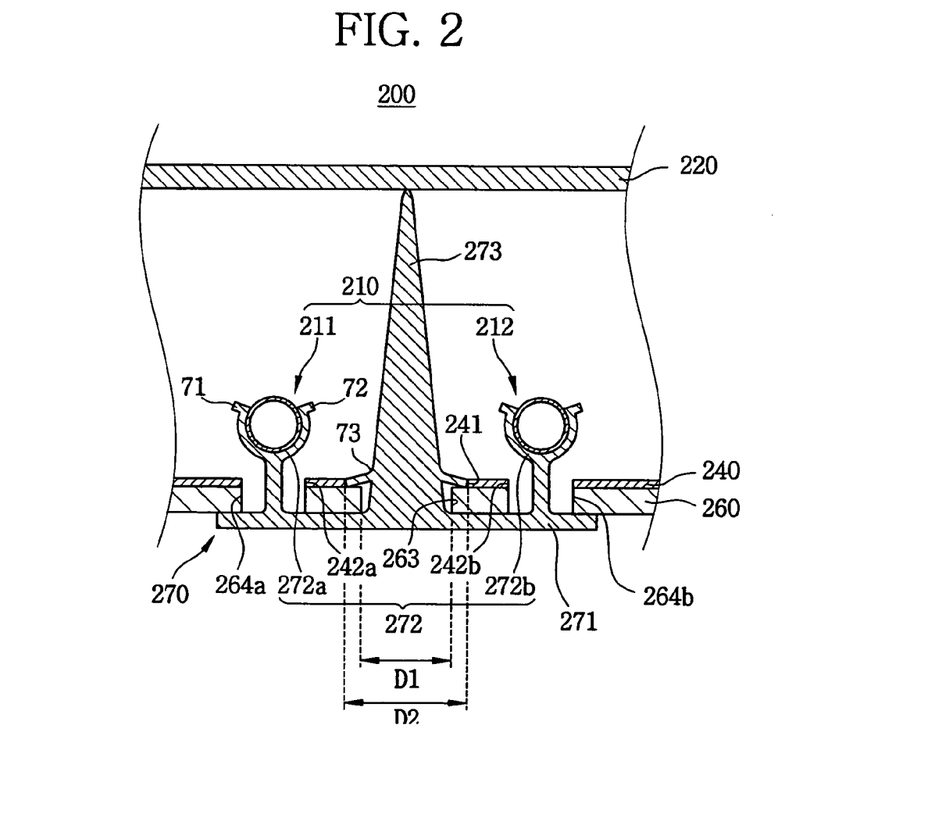
FIG. 2 is a cross-sectional view showing the backlight assembly shown in FIG. 1.
Figure 3:
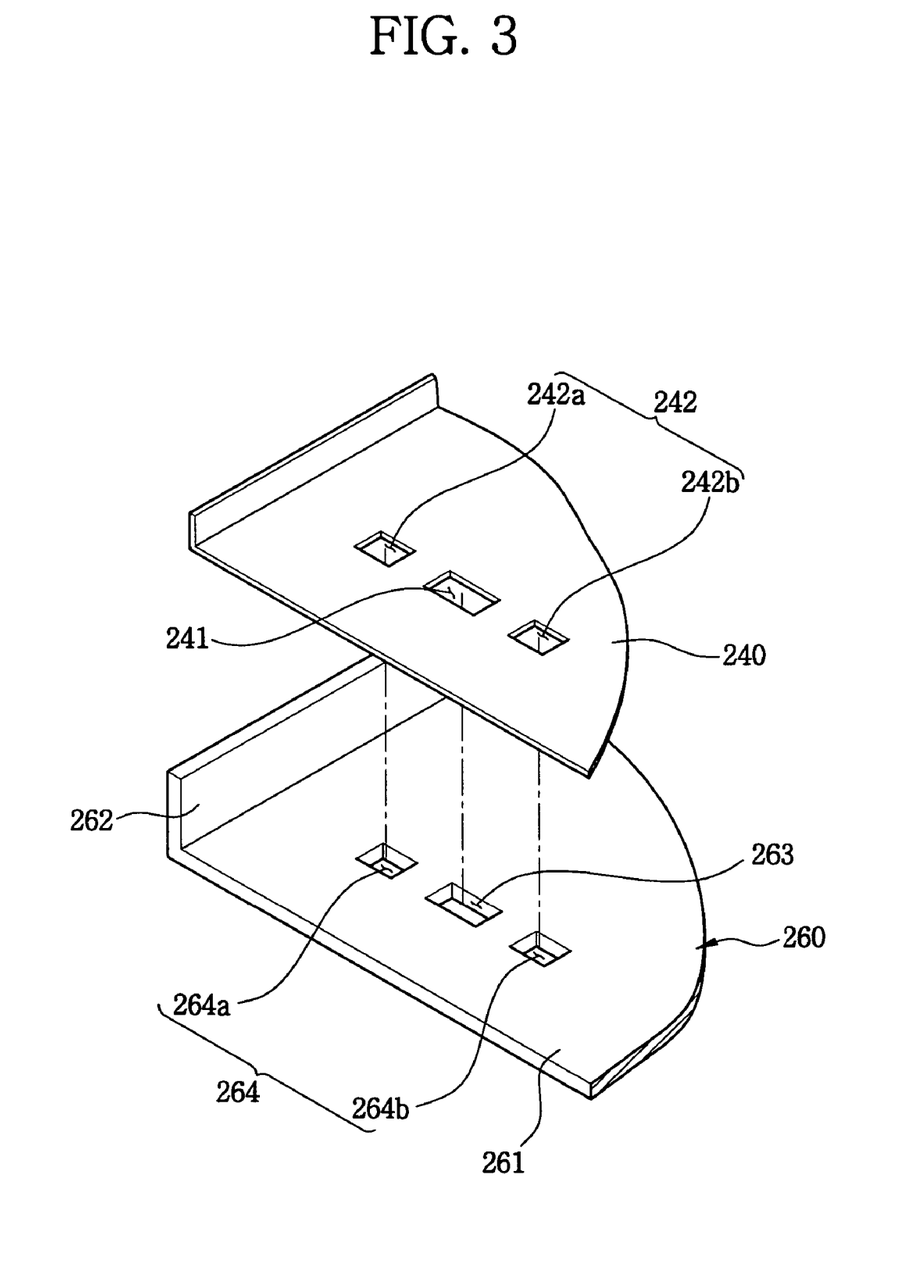
FIG. 3 is an exploded perspective view showing the reflecting plate and the receiving container shown in FIG. 2.

FIG. 2 is a cross-sectional view showing the backlight assembly shown in FIG. 1. FIG. 3 is an exploded perspective view showing the reflecting plate and the receiving container shown in FIG. 2. In FIG. 2, in order to clearly show the receiving container 260 and the supporting member 270, the second mold frame 250 and the diffusing sheet 230 are omitted.

Referring to FIGS. 2 and 3, the reflecting plate 240 is disposed on the receiving container 260, and a portion of the supporting member 270 is disposed under the receiving container 260.

The supporting member 270 includes a base body portion 271, a plurality of lamp holder 272 that receives the lamps 210 so as to fix the lamps 210 to predetermined positions, and a supporting portion 273 that supports the diffusing plate 220.

Particularly, an upper face of the base body portion 271 of the supporting member 270 makes contact with a rear face of the receiving container 260.

The lamp holders 272 are protruded from the upper face of the base body portion 271. The lamp holders 22 have a first lamp holder 272*a* and a second lamp holder 272*b*. In this exemplary embodiment, the supporting member 270 has the first and second lamp holders 272*a* and 272*b*, but number of the lamp holders 272 may be varied in accordance with number of the lamps 210.

The first lamp holder 272*a* receives the first lamp 211 of the lamps 210 so as to fix the first lamp 211 to a predetermined position. The first lamp holder 272*a* includes a first wing portion 71 and a second wing portion 72 that is integrally formed with the first wing portion 71 so as to hold a portion of an outer face of the first lamp 211.

In this exemplary embodiment, the second lamp holder 272*b* has structure substantially identical to the first lamp holder 272*a,* and thus a detailed description of the second lamp holder 272*b* will be described.

The second lamp holder 272*b* receives a second lamp 212 of the lamps 210 so as to fix the second lamp 212 to a predetermined position.

The supporting portion 273 is disposed between the first and second lamp holders 272a and 272b. The supporting portion 273 is protruded from the base body portion 271 toward a direction where the first and second lamp holders 272a and 272b are protruded so as to support the diffusing plate 220. The supporting portion 273 has a coupling protrusion 73 disposed at a position spaced apart from the base body portion 271 and protruded toward a longitudinal direction of the base body portion 271. When the supporting member 270 is inserted into the opening of the receiving container 260, the coupling protrusion 73 is coupled to the upper face of the receiving container 260, thereby preventing the supporting member 270 from being separating from the receiving container 260.

Referring to FIG. 3, the reflecting plate 240 has a first engaging opening 241 formed through the bottom thereof and a second engaging opening 242 formed through the bottom thereof. The first and second lamp holders 272a and 272b are inserted into the second engaging opening 242, and the supporting portion 273 is inserted into the first engaging opening 241. The second engaging opening 242 has a first holder engaging opening 242a through which the first lamp holder 272a is inserted and a second holder engaging opening 242b through which the second lamp holder 272b is inserted. The first engaging opening 241 is disposed between the first and second holder engaging openings 242a and 242b.

The receiving container 260 includes a bottom plate 261 on which the reflecting plate 240 is disposed and a sidewall 262 extended from an edge of the bottom plate 261 to provide a receiving space. The receiving container 260 includes a first opening 263 formed through the bottom plate 261 thereof and a second opening 264 formed through the bottom plate 261 thereof. The first opening 263 is formed at a position corresponding to the first engaging opening 241 and the second opening 264 is formed at a position corresponding to the second engaging opening 242.

The second opening 264 has a first holder opening 264a and a second holder opening 264b corresponding to the first and second holder engaging openings 242a and 242b, respectively. Numbers of the openings formed through the receiving container 260 are identical to numbers of the engaging openings formed through the reflecting plate 240.

The supporting portion 273 is inserted inside the receiving container 260 after sequentially passing through the first opening 263 and the first engaging opening 241. The coupling protrusion 73 of the supporting portion 273 is inserted inside the receiving container 260, and coupled to the bottom plate 261 in a hook-type manner. In this exemplary embodiment, the first opening 263 has a width D1 that is smaller than a width D2 at which the coupling protrusion 73 is formed. Thus, the supporting portion 273 inserted inside the receiving container 260 may be not separated from the receiving container 260 by the hook-type manner of the coupling protrusion 73 and the receiving container 260.

Although not shown in FIGS., a width of the first engaging opening 241 may be identical to or greater than the width D1 of the first opening 263. In case that the width of the first engaging opening 241 is greater than the width D1 of the first opening 263, the width of the first engaging opening 241 is identical to the width D2 at which the coupling protrusion 73 is formed. Thus, the coupling protrusion 73 may be coupled to the reflecting plate 240 in the hook-type manner.

The first lamp holder 272a is inserted inside the receiving container 260 after sequentially passing through the first holder opening 264a and the first holder engaging opening 242a. The second lamp holder 272b is also inserted inside the receiving container 260 after sequentially passing through the second holder opening 264b and the second holder engaging opening 242b.

Figure 4:
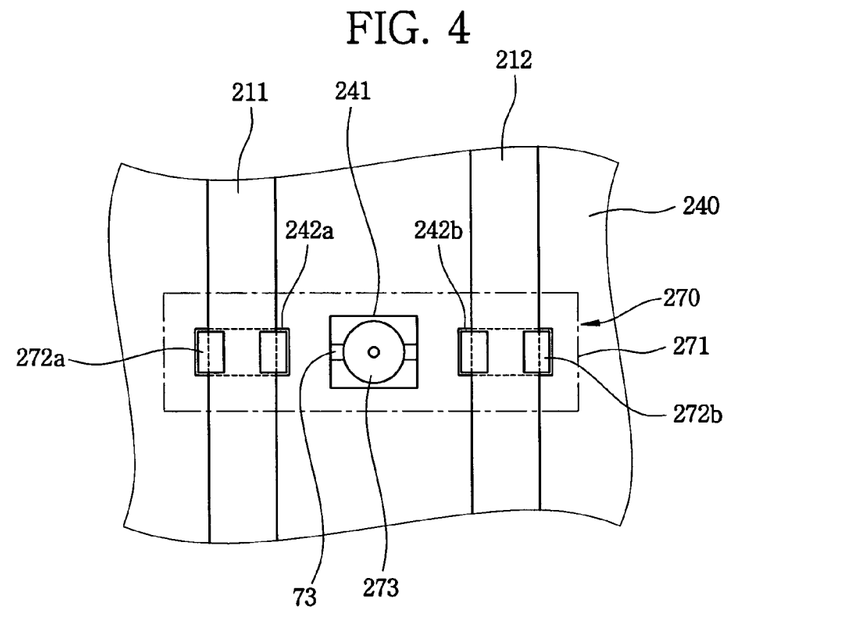
FIG. 4 is a plane view showing the backlight assembly shown in FIG. 2.

FIG. 4 is a plane view showing the backlight assembly shown in FIG. 2. In FIG. 4, in order to clearly show the reflecting plate 240 and the supporting member 270, the diffusing plate 220 and the receiving container 260 are omitted.

Referring to FIG. 4, when the reflecting plate 240 is combined with the receiving container 260, the first lamp holder 272a of the supporting member 270 is disposed on the reflecting plate 240 after sequentially passing through the first holder opening 264a of the receiving container 260 and the first holder engaging opening 242a of the reflecting plate 240. The second lamp holder 272b of the supporting member 270 is also disposed on the reflecting plate 240 after sequentially passing through the second holder opening 264b of the receiving container 260 and the second holder engaging opening 242b of the reflecting plate 240. The supporting portion 273 of the supporting member 270 is also disposed on the reflecting plate 240 after sequentially passing through the first opening 263 of the receiving container 260 and the first engaging opening 241 of the reflecting plate 240. The base body portion 271 of the supporting member 270 is disposed under the receiving container 260 and the reflecting plate.

That is, the first lamp holder 272a, the second lamp holder 272b and the supporting portion 273 are disposed on the reflecting plate 240, but the base body portion 271 is disposed under the reflecting plate 240.

In other words, the first and second lamp holders 272a and 272b holding the first and second lamps 211 and 212 and the supporting portion 273 supporting the diffusing plate 220 of the supporting member 270 are disposed on the reflecting plate 240, and the base body portion 271 is disposed under the reflecting plate 240 of the supporting member 270.

The first lamp holder 272a and the second lamp holder 272b and the supporting portion 273 disposed on the reflecting plate 240 are fixed to the receiving container 260 by the hook-type manner between the coupling protrusion 73 protruded from the supporting portion 273 and the receiving container 260. Thus, an area of the reflecting plate 240 covered by the supporting member 270 may be reduced.

As a result, an area of the reflecting plate 240 that reflects the light emitted from the lamps 210 may increase, and the reflecting plate 240 may uniformly reflect the light over the whole area thereof. Thus, the backlight assembly 200 may provide the light having uniform light distribution to the liquid crystal display panel 100 so that the flat panel display apparatus 500 may improve display quality of the image displayed thereon.

Figure 5:
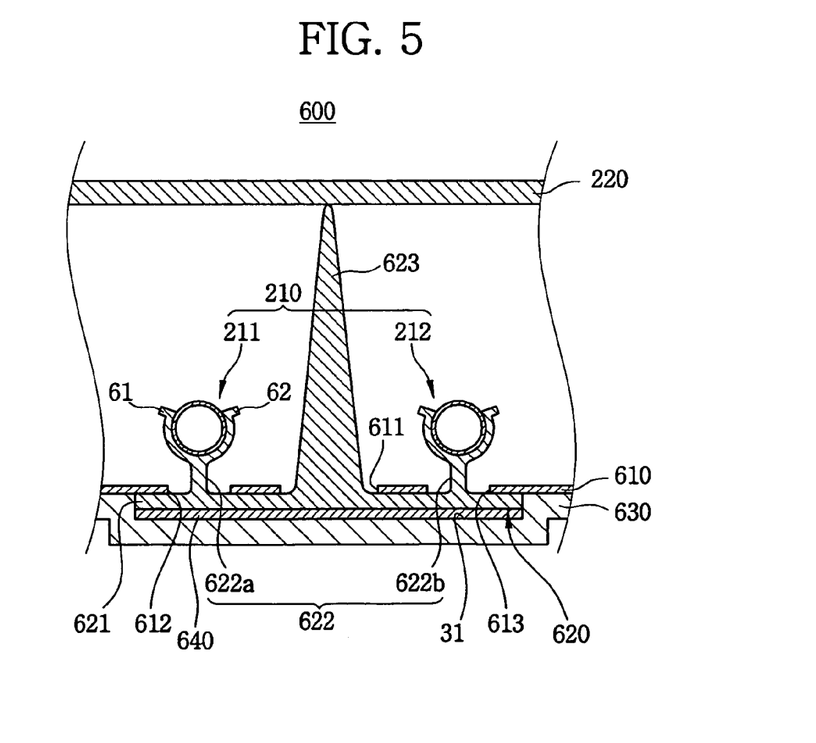
FIG. 5 is a cross-sectional view showing a backlight assembly according to another exemplary embodiment of the present invention.

FIG. 5 is a cross-sectional view showing a backlight assembly according to another exemplary embodiment of the present invention.

Referring to FIG. 5, a backlight assembly 600 according to another exemplary embodiment of the present invention has same structure as the backlight assembly 200 shown in FIG. 2 except for a reflecting plate 610, a supporting member 620 and a receiving container 630. Therefore, in FIG. 5, the same reference numerals denote the same elements in FIG. 2, and thus the detailed descriptions of the same elements will be omitted.

The backlight assembly 600 includes a plurality of lamps 210, a diffusing plate 220 that diffuses a light emitted from the lamps 210, the reflecting plate 610 that reflects the light from the lamps 210 to the diffusing plate 220, the supporting member 620 that uniformly maintains an interval between the lamps 210 and the diffusing plate 220 and the receiving container 630.

In FIG. 5, the lamps 210 have a first lamp 211 and a second lamp 212, but the flat panel display apparatus 500 may have substantially more than two lamps.

The first and second lamps 211 and 212 are arranged in parallel to each other so as to uniformly provide the light to the liquid crystal display panel 100 (not shown, refer to FIG. 1). The first and second lamps 211 and 212 are spaced apart from the diffusing plate 220, and each of the first and second lamps 211 and 212 is spaced apart from each other in a predetermined interval.

More particularly, the diffusing plate 220 is disposed on the first and second lamps 211 and 212, and the reflecting plate 610 is disposed under the first and second lamps 211 and 212.

The reflecting plate 610 has a plurality of engaging openings into which a portion of the supporting member 620 is inserted.

A remaining portion of the supporting member 620 is disposed under the reflecting plate 610. The supporting member 620 has a base body portion 621, a plurality of lamp holders 622 that fixes the first and second lamps 211 and 212 to a predetermined position, and supporting portion 623 that supports the diffusing plate 220.

Particularly, an upper face of the base body portion 621 disposed under the reflecting plate 610 makes contact with a lower face of the reflecting plate 610.

The lamp holders 622 are protruded from the upper face of the base body portion 621. The lamp holders 622 have a first lamp holder 622a and a second lamp holder 622b. In this exemplary embodiment, the supporting member 620 has two lamp holders, but numbers of the lamp holders may be varied in accordance with numbers of the lamps 210.

The first lamp holder 622a receives the first lamp 211 of the lamps 210 so as to fix the first lamp 211 to a predetermined position. The first lamp holder 622a includes a first wing portion 61 and a second wing portion 62 that is integrally formed with the first wing portion 61 so as to hold a portion of an outer face of the first lamp 211.

In this exemplary embodiment, the second lamp holder 622b has structure substantially identical to the first lamp holder 622a. Thus, a detailed description of the second lamp holder 622b will be omitted.

The second lamp holder 622b receives the second lamp 212 of the lamps 210 so as to fix the second lamp 212 to a predetermined position.

The supporting portion 623 is disposed between the first and second lamp holders 622a and 622b. The supporting portion 623 is protruded from the base body portion 621 toward the diffusing plate 220 to support the diffusing plate 220.

The first lamp holder 622a, the second lamp holder 622b and the supporting portion 623 are inserted through a plurality of engaging holes formed through the reflecting plate 610 toward the diffusing plate 220.

The reflecting plate 610 has a first engaging hole 611 into which the supporting portion 623 is inserted and a second engaging hole into which the first and second lamp holders 622a and 622b is inserted.

The second engaging hole has a first holder engaging hole 612 into which the first lamp holder 622a is inserted and a second holder engaging hole 613 into which the second lamp holder 622b is inserted. The first engaging hole 611 is disposed between the first and second holder engaging holes 612 and 613.

The reflecting plate 610 and the supporting member 620 are received into the receiving container 630. In order to receive the base body portion 621 of the supporting member 620, the receiving container 630 has a receiving recess 31 formed at a bottom plate thereof. The receiving container 630 may prevent separation of the reflecting plate 610 from the bottom plate of the receiving container 630.

An adhesive member 640 is disposed between the base body portion 621 of the supporting member 620 and the receiving container 630. The adhesive member 640 adheres the base body portion 621 of the supporting member 620 to a bottom face of the receiving recess 31 to improve coherence between the supporting member 620 and the receiving container 630.

Figure 6:
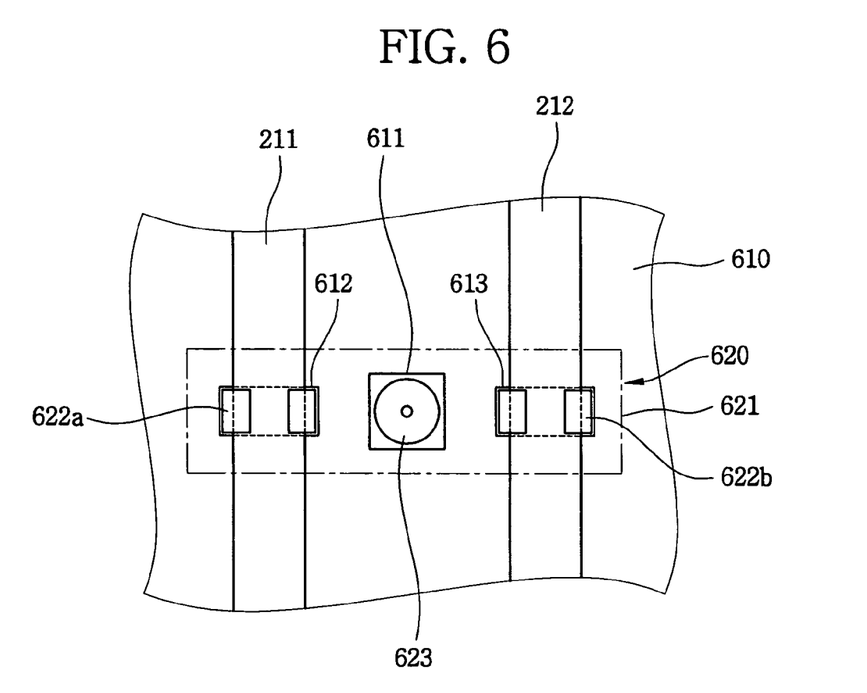
FIG. 6 is a plane view showing the backlight assembly shown in FIG. 5.

FIG. 6 is a plane view showing the backlight assembly shown in FIG. 5. In FIG. 6, in order to clearly show the reflecting plate 610 and the supporting member 620, the diffusing plate 220 and the receiving container 630 will be omitted.

Referring to FIG. 6, when the supporting member 620 is coupled to the reflecting plate 610, the first lamp holder 622a and the second lamp holder 622b of the supporting member 620 are disposed on the reflecting plate 610 after passing through the first holder engaging opening 612 and the second holder engaging opening 613 of the reflecting plate 610. The supporting portion 623 of the supporting member 620 is also disposed on the reflecting plate 610 after passing through the first engaging opening 611 disposed between the first and second holder engaging openings 612 and 613 of the reflecting plate 610. The base body portion 621 of the supporting member 610 is disposed under the reflecting plate 610.

That is, the first lamp holder 622a, the second lamp holder 622b and the supporting portion 623 are disposed on the reflecting plate 610, but the base body portion 621 is disposed under the reflecting plate 610.

In other words, since the base body portion 621 of the supporting member 610 is disposed under the reflecting plate 610, an area of the reflecting plate 610 covered by the supporting member 620 may be reduced. As a result, an area of the reflecting plate 610 that reflects the light emitted from the lamps 210 may increase, and the reflecting plate 610 may uniformly reflect the light over the whole area thereof. Thus, the backlight assembly 600 may provide the light having uniform light distribution to the liquid crystal display panel (not shown).

Figure 7:
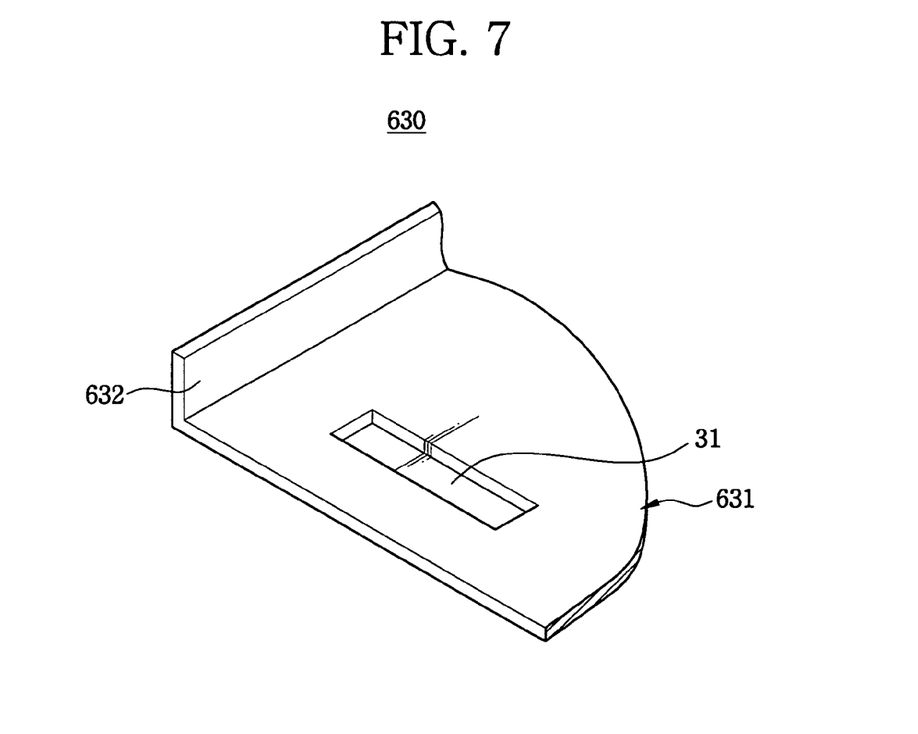
FIG. 7 is a perspective view showing the receiving container shown in FIG. 4.

FIG. 7 is a perspective view showing the receiving container shown in FIG. 4.

Referring to FIG. 7, the receiving container 630 has a bottom plate 631 on which the supporting member 620 and the reflecting plate 610 are sequentially disposed and a sidewall 632 extended from an edge of the bottom late 631 to provide a receiving space.

Particularly, the receiving recess 31 is formed at the bottom plate 631 of the receiving container 630 so as to receive the base body portion 621 of the supporting member 620. The receiving recess 31 is formed by partially recessing the bottom plate 631 of the receiving container 610. Thus, the bottom plate 631 of the receiving container 630 corresponding to the receiving recess 31 is outwardly protruded such that a receiving space of the receiving recess 31 may be sufficiently obtained. As a result, the receiving container 630 may prevent separation of the reflecting plate 610 from the bottom plate 631 of the receiving container 630. In this exemplary embodiment, a depth of the receiving recess 31 is substantially equal to a thickness that is a sum of thicknesses of the base body portion 621 and the adhesive member 640.

According to the present invention, the backlight assembly has the lamps, the reflecting plate disposed under the lamps and the diffusing plate disposed on the lamps. The backlight assembly also further has the lamp holder uniformly maintaining the interval between the lamps and the supporting member having the supporting portion supporting the diffusing plate. The reflecting plate has the engaging openings, the lamp holder and the supporting portion inserted through the engaging openings, and the base body portion integrally formed with the lamp holder and the supporting portion is disposed under the reflecting plate.

Thus, the area of the reflecting plate covered by the supporting member may be reduced. Therefore, the flat panel display apparatus may enhance an amount of the light reflected from the reflecting plate and uniformity of the light, thereby improving the display quality of the image.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly, comprising:
   a lamp that emits a light;
   a diffusing member that diffuses the light provided from the lamp;
   a reflecting member disposed under the lamp, the reflecting member reflecting the light provided from the lamp to the diffusing member; and,
   a supporting member disposed under the reflecting member to support the diffusing member, the supporting member partially passing through the reflecting member and upwardly protruded with respect to the reflecting member.

2. The backlight assembly of claim 1, wherein the reflecting member comprises a first engaging opening formed therethrough such that a portion of the supporting member is inserted into the first engaging opening, thereby upwardly protruding the portion of the supporting member with respect to the reflecting member.

3. The backlight assembly of claim 2, wherein the supporting member comprises:
   a base body portion disposed under the reflecting member; and,
   a supporting portion protruded from the base body portion to the diffusing member through the first engaging opening, so as to support the diffusing member.

4. The backlight assembly of claim 3, wherein the reflecting member comprises a second engaging opening spaced apart from the first engaging opening, and
   wherein the supporting member further comprises a lamp holder protruded from the base body portion to the diffusing member through the second engaging opening so as to hold the lamp.

5. The backlight assembly of claim 4, further comprising a receiving container that receives the lamp, the supporting member and the reflecting member.

6. The backlight assembly of claim 5, wherein the receiving container comprises a bottom plate located between the base body portion of the supporting member and the reflecting member.

7. The backlight assembly of claim 6, wherein the receiving container comprises a first opening which is formed at a position corresponding to the first engaging opening and into which the supporting member is inserted, and
   wherein the supporting member sequentially passes through the first opening and the first engaging opening so that the supporting portion of the supporting member is upwardly protruded with respect to the reflecting member.

8. The backlight assembly of claim 7, wherein the supporting member comprises a protrusion protruded from the supporting member, spaced apart from the reflecting member in a predetermined distance, and combined in a hook-type manner with the bottom surface of the receiving container so as to prevent the supporting member from being separated from the receiving container.

9. The backlight assembly of claim 6, wherein the receiving container comprises a second opening which is formed at a position corresponding to the second engaging opening and into which the lamp holder is inserted, and
   wherein the lamp holder sequentially passes through the second opening and the second engaging opening so that the lamp holder is upwardly protruded with respect to the reflecting member.

10. The backlight assembly of claim 5, wherein the bottom surface of the receiving container is disposed under the base body portion.

11. The backlight assembly of claim 10, further comprising an adhesive interposed between the base body portion of the supporting member and the receiving container so as to adhere the supporting member to the receiving container.

12. The backlight assembly of claim 10, wherein the receiving container comprises a receiving recess formed at a position corresponding to the base body portion so as to sequentially receive the adhesive and the base body portion of the supporting member.

13. A flat panel display apparatus, comprising:
    a display panel tat displays an image using a light externally provided; and,
    a backlight assembly comprising:
    a lamp that emits a light;
    a diffusing member that diffuses the light provided from the lamp and provides the diffused light to the display panel;
    a reflecting member disposed under the lamp, the reflecting member reflecting the light provided from the lamp to the diffusing member; and,
    a supporting member disposed under the reflecting member to support the diffusing member, the supporting member partially passing through the reflecting member and upwardly protruded with respect to the reflecting member.

14. The flat panel display apparatus of claim 13, wherein the reflecting member comprises a first engaging opening formed therethrough such that a portion of the supporting member is inserted into the first engaging opening, thereby upwardly protruding the portion of the supporting member with respect to the reflecting member.

15. The flat panel display apparatus of claim 14, wherein the supporting member comprises:
    a base body portion disposed under the reflecting member; and,
    a supporting portion protruded from the base body portion to the diffusing member through the first engaging opening, so as to support the diffusing member.

16. The flat panel display apparatus of claim 15, wherein the reflecting member comprises a second engaging opening spaced apart from the first engaging opening, and wherein the supporting member further comprises a lamp holder protruded from the base body portion to the diffusing member through the second engaging opening so as to hold the lamp.

17. The flat panel display apparatus of claim 16, further comprising a receiving container that receives the lamp, the supporting member and the reflecting member.

18. The flat panel display apparatus of claim 17, wherein the receiving container comprises a bottom plate located between the base body portion of the supporting member and the reflecting member.

19. The flat panel display apparatus of claim 18, wherein the receiving container comprises a first opening which is formed at a position corresponding to the first engaging opening and into which the supporting member is inserted, and
wherein the supporting member sequentially passes through the first opening and the first engaging opening so that the supporting portion of the supporting member is upwardly protruded with respect to the reflecting member.

20. The flat panel display apparatus of claim 19, wherein the supporting member comprises a protrusion protruded from the supporting member, spaced apart from the reflecting member in a predetermined distance, and combined in a hook-type manner with the bottom surface of the receiving container so as to prevent the supporting member from being separated from the receiving container.

21. The flat panel display apparatus of claim 18, wherein the receiving container comprises a second opening which is formed at a position corresponding to the second engaging opening and into which the lamp holder is inserted, and
wherein the lamp holder sequentially passes through the second opening and the second engaging opening so that the lamp holder is upwardly protruded with respect to the reflecting member.

22. The flat panel display apparatus of claim 17, wherein the bottom surface of the receiving container is disposed under the base body portion of the supporting member.

23. The flat panel display apparatus of claim 22, wherein the backlight assembly further comprises an adhesive interposed between the base body portion of the supporting member and the receiving container so as to adhere the supporting member to the receiving container.

24. The flat panel display apparatus of claim 22, wherein the receiving container comprises a receiving recess formed at a position corresponding to the base body portion so as to sequentially receive the adhesive and the base body portion of the supporting member.

* * * * *